United States Patent
Andre et al.

(10) Patent No.: US 9,753,795 B2
(45) Date of Patent: Sep. 5, 2017

(54) EFFICIENT DATA SYSTEM ERROR RECOVERY

(71) Applicant: INTERNATIONAL BUSINESS MACHINES CORPORATION, Armonk, NY (US)

(72) Inventors: Herve G. P. Andre, Orlando, FL (US); Larry Juarez, Tucson, AZ (US); Brian A. Rinaldi, Tucson, AZ (US); Todd C. Sorenson, Tucson, AZ (US); Liang H. Wu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 14/147,745

(22) Filed: Jan. 6, 2014

(65) Prior Publication Data

US 2015/0193289 A1    Jul. 9, 2015

(51) Int. Cl.
    *G06F 11/28*    (2006.01)
    *G06F 11/07*    (2006.01)
    *G06F 11/30*    (2006.01)

(52) U.S. Cl.
    CPC ........ *G06F 11/076* (2013.01); *G06F 11/0706* (2013.01); *G06F 11/30* (2013.01)

(58) Field of Classification Search
    USPC ........................................ 714/47.1
    See application file for complete search history.

(56) References Cited

U.S. PATENT DOCUMENTS

| | | | |
|---|---|---|---|
| 7,493,516 B2* | 2/2009 | Ferren et al. ................... | 714/10 |
| 7,624,178 B2 | 11/2009 | Tevis | |
| 7,814,368 B2* | 10/2010 | Hogan et al. ................... | 714/22 |
| 7,849,387 B2 | 12/2010 | Biswas et al. | |
| 8,041,984 B2* | 10/2011 | Kalos ............................... | 714/3 |
| 8,135,987 B2* | 3/2012 | Douceur et al. ............... | 714/15 |
| 8,321,727 B2 | 11/2012 | D'Abreu et al. | |
| 8,448,013 B2* | 5/2013 | Clark et al. .................. | 714/4.11 |
| 2003/0079160 A1* | 4/2003 | McGee et al. ................. | 714/39 |
| 2006/0064527 A1* | 3/2006 | Fisher et al. ................. | 710/200 |
| 2006/0265625 A1* | 11/2006 | Dubois et al. ................. | 714/6 |
| 2007/0220366 A1* | 9/2007 | Bose et al. ..................... | 714/47 |
| 2007/0226631 A1* | 9/2007 | Tevis ........................... | 715/736 |
| 2008/0082725 A1 | 4/2008 | Elhamias | |
| 2010/0153816 A1* | 6/2010 | Li et al. ........................ | 714/758 |
| 2011/0087928 A1* | 4/2011 | Daud ................. | G06F 11/0709 714/42 |
| 2011/0099444 A1* | 4/2011 | Tredoux ....................... | 714/746 |
| 2014/0237298 A1* | 8/2014 | Pe'er ............................... | 714/42 |

OTHER PUBLICATIONS

Liu Gang et al., "A fault detection mechanism in erasure-code Byzantine fault-tolerance quorum" pp. 1453-1456, vol. 11, No. 6, Wuhan University Journal of Natural Sciences, China.
Lei Kong et al, "A reconfigurable Byzantine quorum approach for the Agile Store" pp. 219-228, IEEE Comput. Soc., Sch. of Electr. & Comput. Eng., Georgia Inst. of Tech., Atlanta, GA.

* cited by examiner

*Primary Examiner* — Kamini Patel
(74) *Attorney, Agent, or Firm* — Griffiths & Seaton PLLC (57) ABSTRACT

Dynamically adjust an error threshold in a data system based system status changes caused by either an external environment and/or an internal status.

14 Claims, 6 Drawing Sheets

EFFICIENT DATA SYSTEM ERROR RECOVERY

BACKGROUND OF THE INVENTION

Field of the Invention

The present invention relates in general to computers, and more particularly to efficient data system error recovery in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Computers are very powerful tools for storing and providing access to vast amounts of information. Often times a data system in the computing system often encounter various types of errors. Thus, a need exists for efficient data system error recovery within the computing database.

SUMMARY OF THE DESCRIBED EMBODIMENTS

In one embodiment, a method is provided for efficient data system error recovery using a processor device in a computing environment. In one embodiment, by way of example only, an error threshold is dynamically adjusted in a data system based system status changes caused by either an external environment and/or an internal status.

In another embodiment, a computer system is provided for efficient data system error recovery using a processor device, in a computing environment. The computer system includes a computer-readable medium and a processor in operable communication with the computer-readable medium. In one embodiment, by way of example only, the processor dynamically adjusts an error threshold in a data system based system status changes caused by either an external environment and/or an internal status.

In a further embodiment, a computer program product is provided for efficient data system error recovery using a processor device, in a computing environment. The computer-readable storage medium (e.g., a non-transitory computer-readable storage medium) has computer-readable program code portions stored thereon. The computer-readable program code portions include a first executable portion that dynamically adjusts an error threshold in a data system based on system status changes caused by either an external environment and/or an internal status.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

In one embodiment, a data storage and retrieval systems is used to store information provided by one or more host computer systems. The data storage and retrieval systems receive requests to write information to one or more data storage devices, and requests to retrieve information from those one or more data storage devices. Upon receipt of a write request, the system stores information received from a host computer in one or more data storage devices. Upon receipt of a read request, the system recalls information from the one or more data storage devices. Thus, the system is continuously moving information to and from one or more data storage devices, and optionally to and from a data cache.

In one embodiment, the data storage and retrieval systems is designed to recover from hardware errors. In one embodiment, error thresholds are set, and when a particular piece of hardware/software application exceeds the applicable error thresholds, a permanent hardware error is detected. In response to such an error, the errant resource/application may be disabled.

In one embodiment, the data system may detect errors to self-diagnose the systems: Low error rates may be ignored because they may not significantly impact the performance of the processor; however higher error rates may indicate more severe errors. Error thresholds may be used to detect more severe errors by determining whether an error occurs at a rate above a threshold. Errors are often processed in a round-robin scheme that reduces code-processing overhead. For example, if one error is detected, it is monitored or logged and may be used to update a threshold count. A second error is processed on a next iteration or pass after a first error. If a certain number of errors are detected within a given amount of time (e.g. 10 errors in one minute), a threshold may be reached. If the threshold is not reached in the given amount of time, the threshold count is reset. If a time limit for an error threshold passes before all of the errors have been processed, a high error rate may not be detected, and severe errors may not be found. It is desirable for a method and system that detects high error rates more accurately without increasing code-processing overhead.

However, current solutions do not allow thresholds levels to be dynamically changed based on a system status change. Thus, in a particular system environment, if the code/algorithm wanted to take a given threshold action at either a higher or lower threshold level then it cannot be done. For instance if an adapter is the last adapter in a set of redundant adapters then taking an action against that adapter may cause a loss of access from the host. Thus, the error recovery code would want to be more tolerant of the given error. Therefore a need exists for error thresholds to be dynamically adjusted based on system status. In one embodiment, the present invention dynamically adjusts error thresholds in a data storage system, based on a system status changes. Theses changes can either be from outer and/or external environment, and/or from internal/inner status. The types of status changes may include, but are not limited to: 1) availability of partner redundant resources, 2) historical input/output (I/O) loads of the system/device, 3) a host server currently running critical applications, and 4) application, code, and/or hardware updates in progress, registered information in the data system relating to the application and/or hardware, and other types of changes to the system that may be defined.

Figure 1:
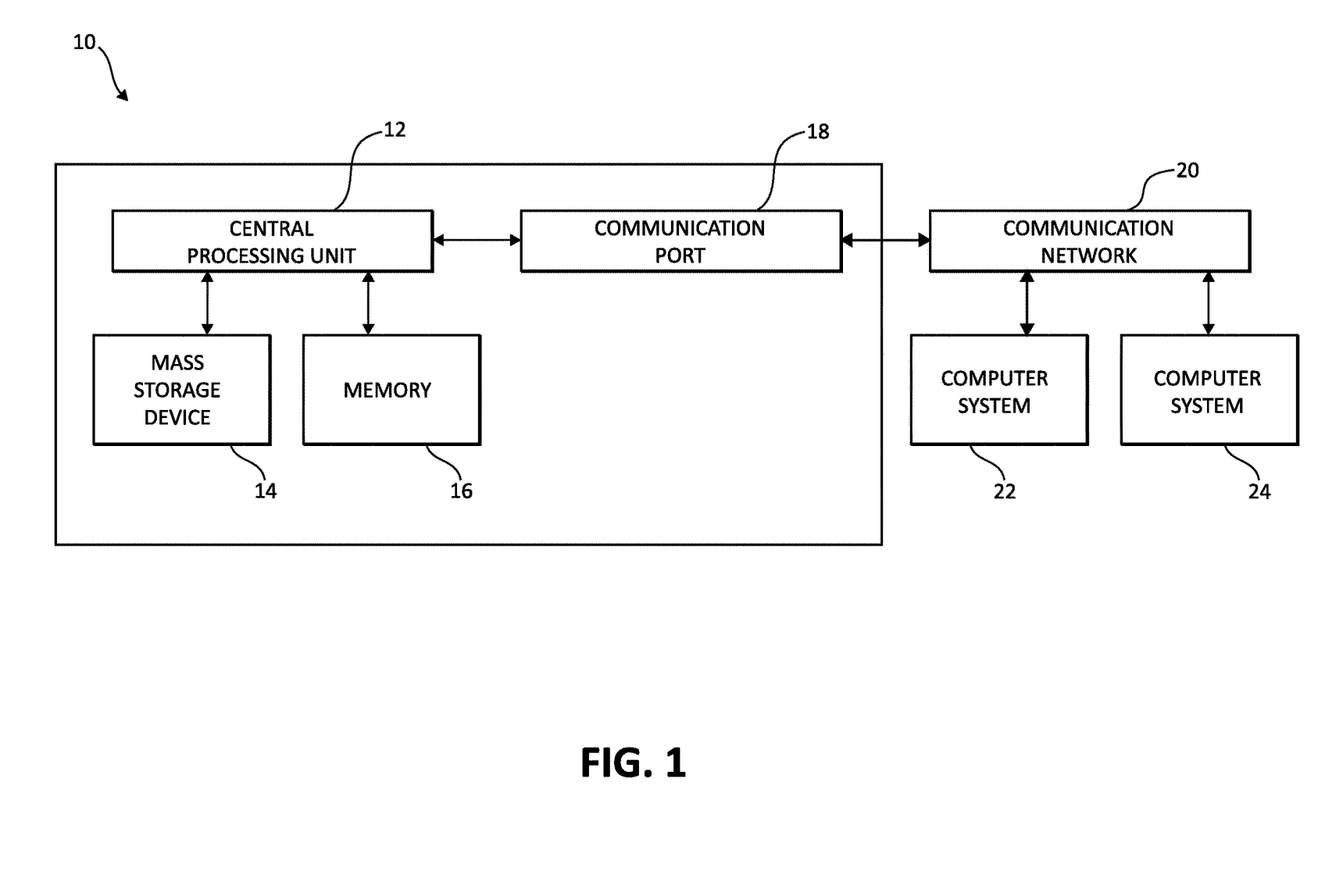
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
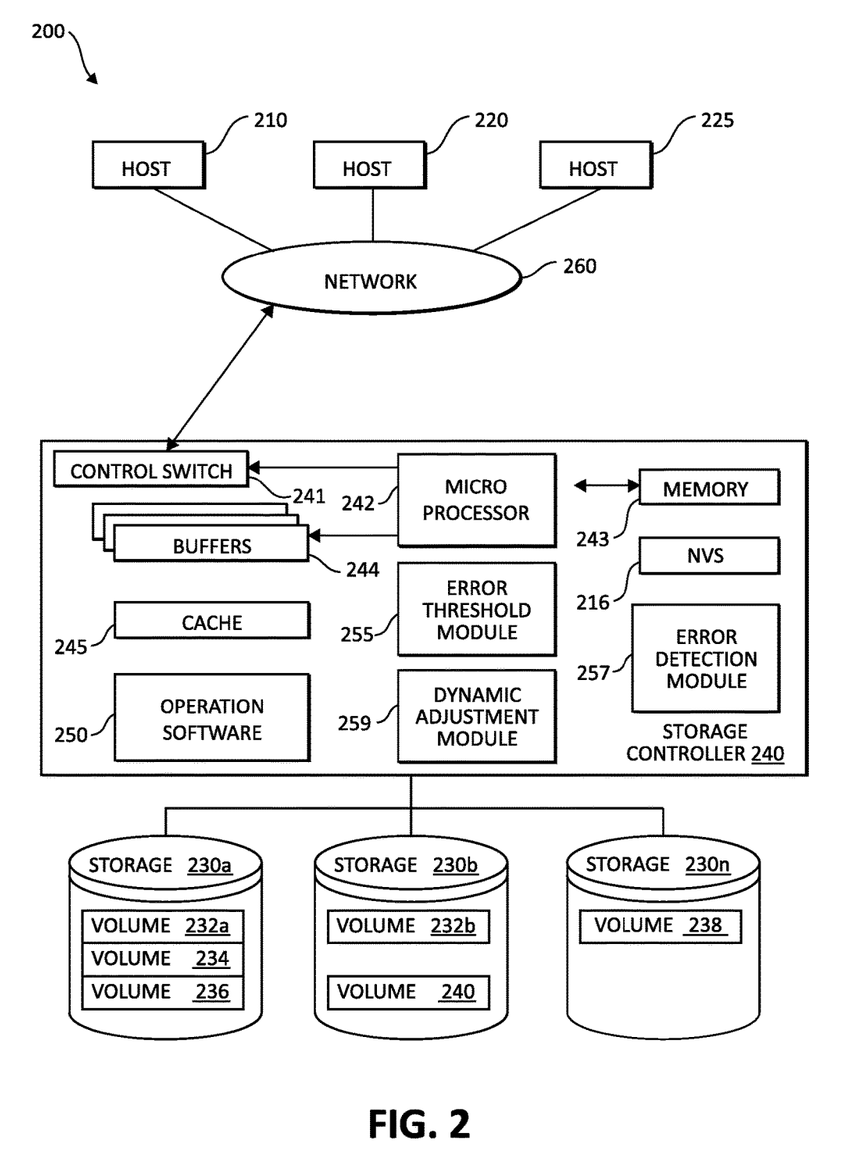
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an error threshold module 255, an error detection module 257, and a dynamic adjustment module 259. The Error threshold module 255, the error detection module 257, and the dynamic adjustment module 259 may work in conjunction with each and every component of the storage controller 240, the hosts 210, 220, 225, and storage devices 230. The Error threshold module 255, the error detection module 257, and the dynamic adjustment module 259 may be structurally one complete module or may be associated and/or included with other individual modules. The Error threshold module 255, the error detection module 257, and the dynamic adjustment module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, Error threshold module 255, the error detection module 257, and the dynamic adjustment module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the Error threshold module 255, the error detection module 257, and the dynamic adjustment module 259 may also be located in the cache 245 or other components. As such, the Error threshold module 255, the error detection module 257, and the dynamic adjustment module 259 maybe used as needed, based upon the storage architecture and users preferences.

Figure 3:
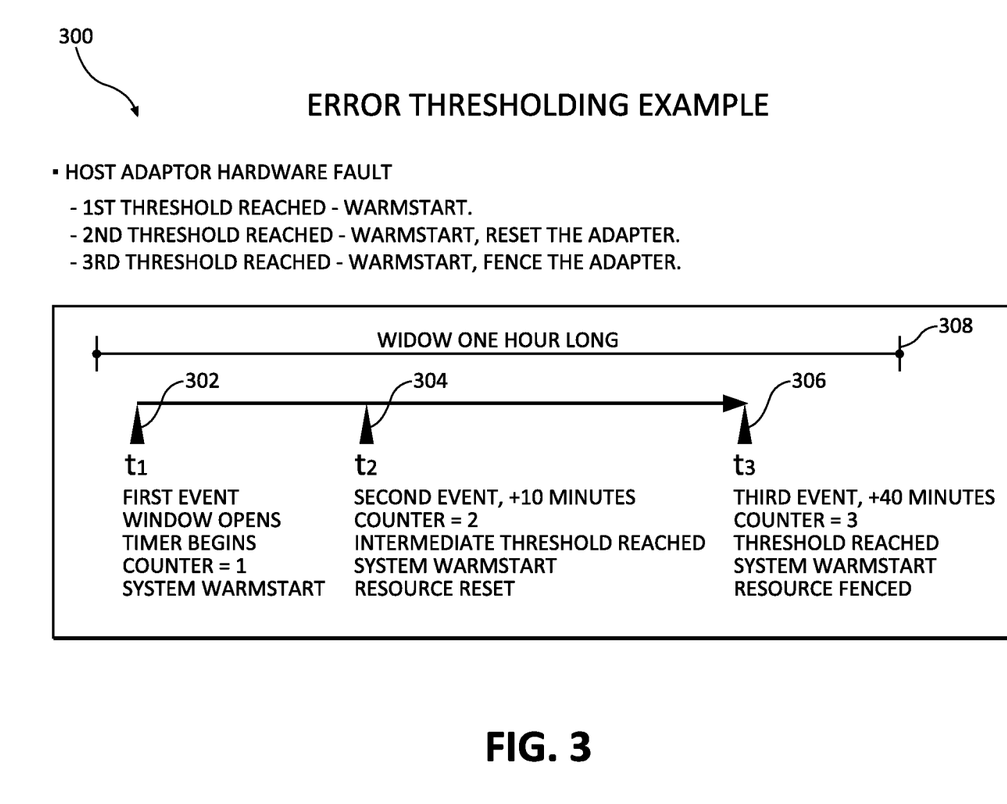
FIG. 3 is a block diagram illustrating an exemplary error thresholding in which aspects of the present invention may be realized.

As mentioned above, in one embodiment, error thresholds are set, and when a particular piece of hardware exceeds the applicable error threshold, a given recovery is given until the last threshold has been reached and the resource is disabled from causing additional errors. For example, turning now to FIG. 3, is a FIG. 3 is a block diagram 300 illustrating an exemplary error thresholding example in which aspects of the present invention may be realized. In FIG. 3, by way of example only, a host adapter hardware may experience a fault and/or error. FIG. 3 illustrates a time window 308 that measures up to one hour long time period, and at time $t_1$ a $1^{st}$ error threshold is reached and warmstart occurs. The $1^{st}$ error threshold window opens a timer and begins a counter and the counter equals a first system restart. At $t_2$ a $2^{nd}$ error threshold is reached and warmstart occurs and the adaptor is reset. The $2^{nd}$ error threshold is at plus 10 minutes from the $1^{st}$ error threshold and the counter reaches a second intermediate error threshold and a system warmstart is performed along with the resource (e.g., adaptor) is reset. At $t_3$ a 3rd error threshold is reached and warmstart occurs and the adaptor is fenced. The third error threshold event is at plus 40 minutes from the $1^{st}$ error threshold and the counter reaches a third error threshold and a system warmstart is performed along with the resource (e.g., adaptor) is fenced.

However, current solutions do not allow the thresholds levels to be dynamically changed based on a system status change. Thus in a particular system environment if the code wanted to take a given threshold action at either a higher or lower threshold level then it cannot be done. Therefore the present invention addresses the need for error thresholds to be dynamically adjusted based on system status. In one embodiment, the present invention dynamically adjusts error thresholds in a data storage system, based on a system status changes. Theses changes can either be from outer and/or external environment and/or from internal/inner status.

Figure 4:
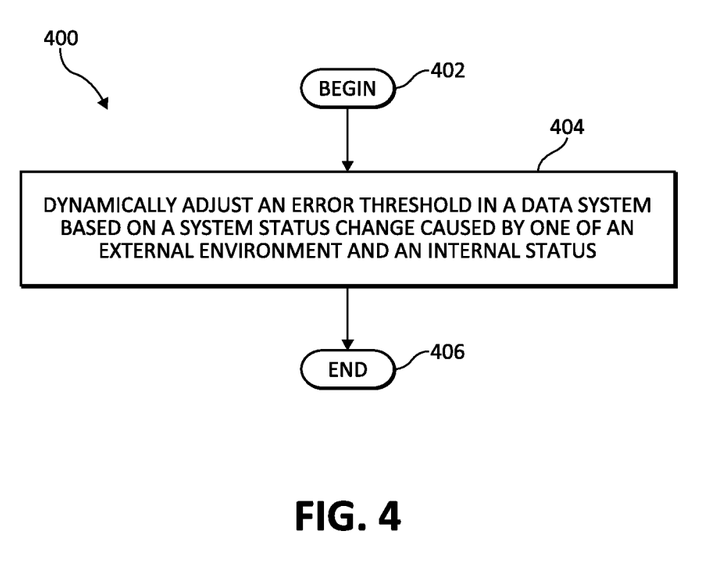
FIG. 4 is a flowchart illustrating an exemplary method for dynamically adjusting error thresholds based on system status in a computing environment in which aspects of the present invention may be realized.

FIG. 4 is a flowchart illustrating an exemplary method 400 for efficient dynamically adjusting error thresholds in a computing environment in which aspects of the present invention may be realized. The method 400 begins (step 402). The method 400 dynamically adjusts an error threshold in a data system based on a system status change caused by one of an external environment and an internal status (step 404). The method 400 ends (step 406).

In one embodiment, the present invention defines a thresholding structure with high low and medium threshold values (the high, low, and medium thresholds may be predetermined, adjusted on the fly, and/or changed based on user preferences, system requirements, and/or historical data used for making a dynamic determination). However, based upon need and system requirements, the present invention may use more than just high, low, and medium, and thus alternative error thresholds values may be defined. In one embodiment, the thresholding structure may contain as many levels of thresholding a user wanted to use and/or use based on system performances/requirements, such as illustrated in the following example, where T1 is a first time period (time 1), and T2 is a second time period, (time 2) and T3 is a third time period (time 3). As illustrated in Table 1, low aggression threshold levels (e.g., aggression levels greater than the default threshold levels) of 5 (at T1), 7 (at T2), and 10 (at T3) are demonstrated respectively at T1, T2, and T3. Default aggression threshold levels of 1 (at T1), 2 (at T2), and 3 (at T3) are demonstrated respectively at T1, T2, and T3. High aggression threshold levels (e.g., aggression levels equal to and/or less than the default threshold levels) of 1 (at T1), 1 (at T2), and 1 (at T3) are demonstrated respectively at T1, T2, and T3.

TABLE 1 using low, median (default), and high error thresholding:

| T1 | T2 | T3 | |
|---|---|---|---|
| 5 | 7 | 10 | -->low aggression threshold level |
| 1 | 2 | 3 | -->default thresholds level |
| 1 | 1 | 1 | -->high aggression threshold level |

Figure 5:
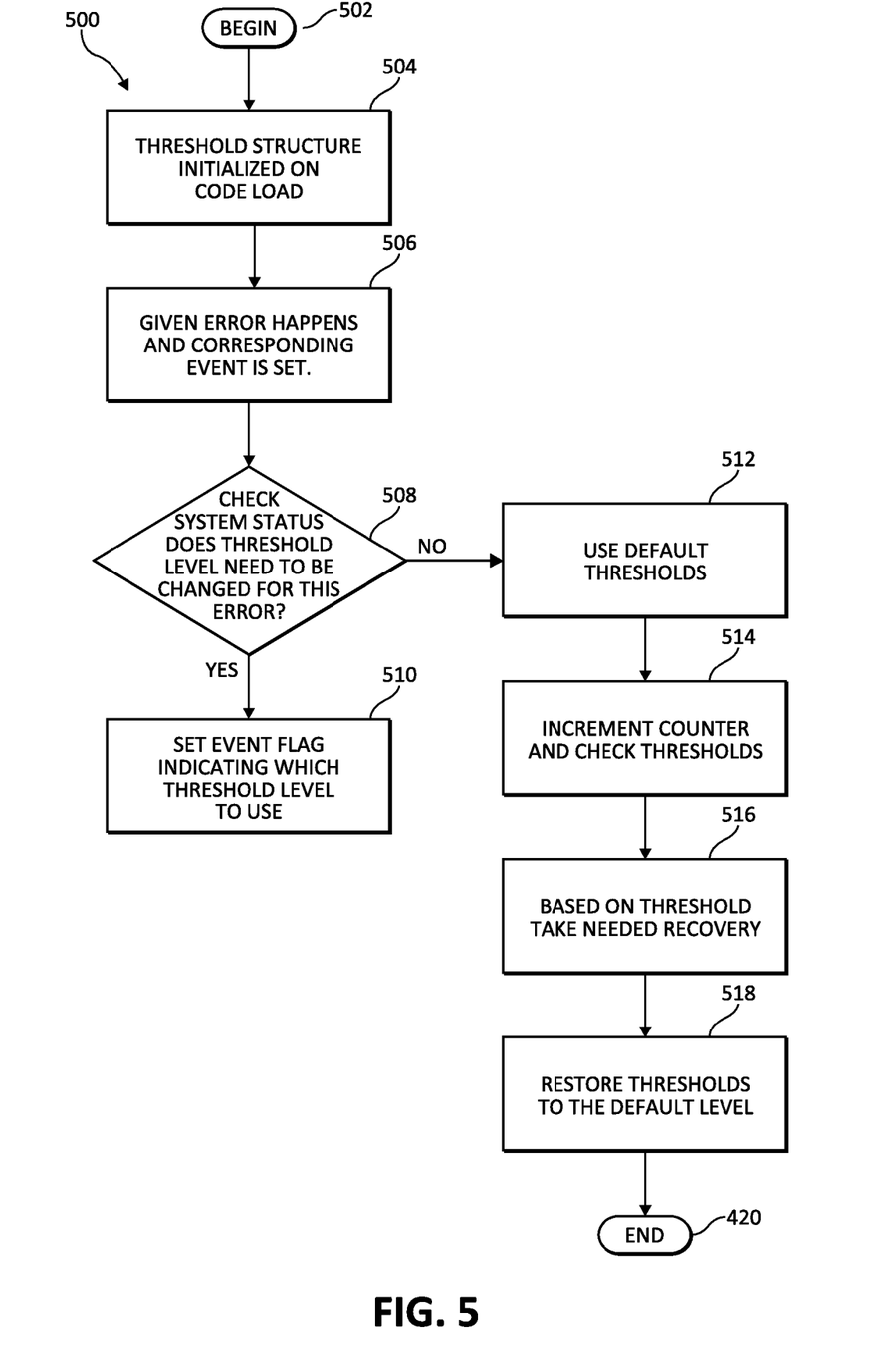
FIG. 5 is a flowchart illustrating an additional exemplary method for dynamically adjusting error thresholds based on system status in a computing environment in which aspects of the present invention may be realized.

In one embodiment, the present invention defines a code "event object" that defines how a particular error should be handled. Turning now to FIG. 5, FIG. 5 describes how the system would dynamically use the different thresholding levels. FIG. 5 is a flowchart illustrating an additional exemplary method 500 for dynamically adjusting error thresholds based on system status in a computing environment in which aspects of the present invention may be realized. The method 500 begins (step 502) with the method 500 initializing an error threshold structure on a computing program code load (step 504). The method 500 detects a given type of error and/or the given type of error occurs and a corresponding error event is set (step 506). The method 500 checks a data system status and determines if an error threshold level needs to be changed for the error that occurring (and/or the detected error) (step 508). If yes, the method 500 sets an error event flag is set that indicates which error threshold level to use (step 510). If no, the method 500 uses one of a multiplicity of default thresholds (e.g., which may be predefined and/or calculated based on historical data) (step 512). From both steps 510 and 512, the method 500 then increments a counter and checks the error thresholds (step 514). The method 500 then takes and/or performs the required error recovery operation based on the error threshold (step 516). The method 500 restores the error thresholds to the default error thresholds (step 518). The method 500 ends (step 520).

Figure 6:
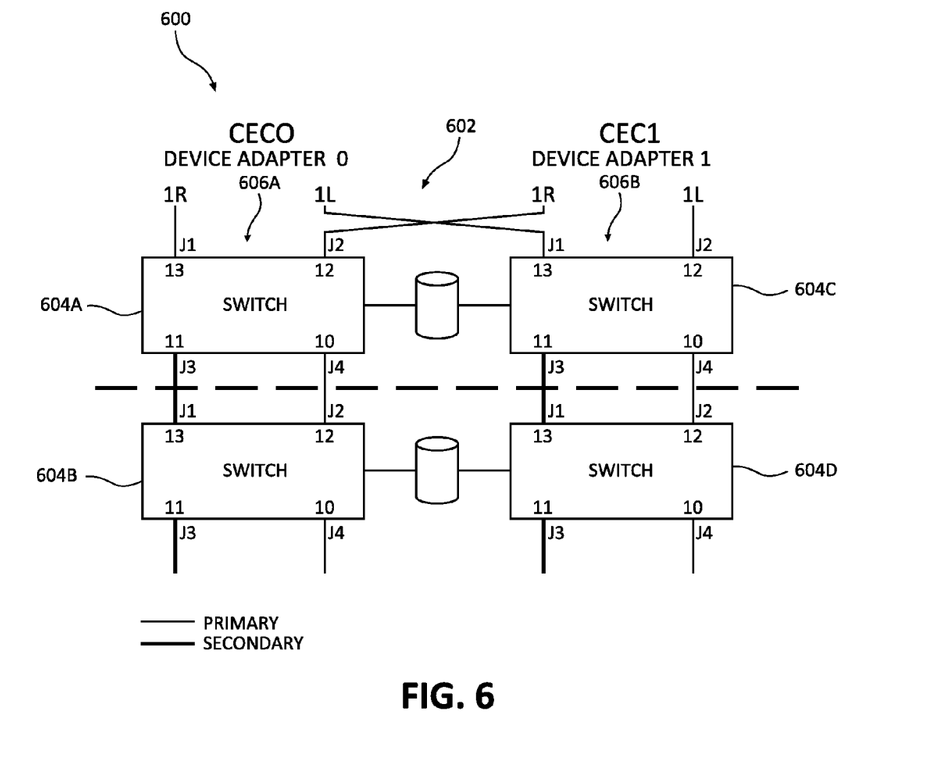
FIG. 6 is a block diagram illustrating an exemplary error thresholding of the present invention using multiple device adaptors in which aspects of the present invention may be realized.

FIG. 6 is a block diagram 600 illustrating an exemplary error thresholding of the present invention using multiple device adaptors in which aspects of the present invention may be realized. FIG. 6 illustrates the implementation of the present invention into an actual data system 602 having a computer electronic complex "CEC" (CEC0 and CEC1) in the data system, with adapters 606 (e.g., device adapter 0 606A and device adapter 1 606B) having a switch 604 (shown in FIG. 6 as 604A-604D), and port connections shown with labels J1-J4 (e.g., Port 1 is J1, Port 2 is labeled J2, Port 3 is labeled J3, and Port 4 is labeled J4 and also labeled with a 1R for right path ad 1L for a left path). For example, in one embodiment, the present invention may be implemented into IBM® DS8870 R7.2 storage system, where there are multiple device adapter pairs in the system. As seen in FIG. 6, central electronics complexes (e.g., CECs) connect to 2 device adapters, which are responsible for access to the various drives. As shown in FIG. 6, the adapter 0 606A, is illustrated, and the adapter 1 606B are redundant to each other so that the present invention may still access to disks if one of the adapters is lost. As illustrated, the adapters 606 have primary and secondary lines/connections. The adapters 606 may suffer from multiple errors when machine is in operational state. For example, the adapter 606 stops errors and reflects the adapter is in a non-efficient state. If the errors exceed a certain threshold (e.g., 3 times, learned from past experience as mentioned above in the example in FIG. 3) the adapter 606 should be disabled and replaced. However, when replacing the bad hardware (e.g., adapter 0 606A), the adapter 1 606B is the last path to the disks because if it is disabled the system 600 will lose access to all disks. So the hardware environment of adapter 1 606B has changed and its corresponding error threshold should be raised. In one embodiment, the microcode will disable adapter 1 606B after 10 errors because this gives the adapter 606B more chances of recovering itself and maintains access to the data. In other words, once the first adapter 606A is fenced (adapter0), adapter1 606B is now last path to the disks so the invention will see that adpater0 606A has went offline and when errors are received on adapter1 606B the present invention will dynamically us the low aggression thresholds as described above.

However, once adapter 0 606A is online again, microcode will turn back to the lower thresholds again as adapter 1 606B is no longer the last path to data. Then it will be immediately disabled after its error exceeds original threshold. Once the adapter0 606A is repaired the present invention will now threshold errors on adapter1 606A and/or adapter0 606A using the default aggression levels as now there are again redundant paths to the data.

In another case/scenario, when the device adapter reports a given error it may indicate via register information that high aggression levels should be used when thresholding. For example, the adapter already fails to communicate to its peer adapter after reset. In this case microcode learns from the adapter register information that the adapter is probably bad. Then microcode will reduce the error thresholds to high aggression level so that the adapter will be disabled immediately. All in all under this scheme, the microcode utilizes system and adapter status information (either external environment or internal hardware) to decide the error threshold at which adapter should be disabled. Thus the errors are handled in the appropriate manner for the current state of the system and thus higher availability is achieved.

Based upon the foregoing description, the present invention provides for efficient data system error recovery using a processor device in a computing environment. In one embodiment, by way of example only, an error threshold is dynamically adjusted in a data system based system status changes caused by either an external environment and/or an internal status. In one embodiment, in a data system, the present invention modifies error thresholding from a default error threshold to either a more lenient threshold (e.g., as compared to the default error threshold) and/or to a more aggressive threshold (e.g., as compared to the default error threshold)) based on system status items. As such, the computing data system improves the efficiency of a data system for achieving a higher availability of the enterprise level systems, while also applying to many kinds of systems.

In one embodiment, the present invention defines error threshold values representing multiple levels for the error threshold. The system status changes include at least one of an availability of a related redundant resource, historical input/output (I/O) loads of the data system, a host server running an application, historical data, registered information to a device in the data system, and/or an in-progress update to an application.

In one embodiment, the present invention defines an event object that defines how a particular error should be handled in the data system, and defines the error threshold with at least high threshold values, medium threshold values, and low threshold values.

In one embodiment, the present invention dynamically adjusts the error threshold from a default error threshold to one of the high threshold values, the medium threshold values, and the low threshold values based on one of the system status changes.

In one embodiment, the present invention sets an event flag indicating the error threshold has been dynamically adjusted from the default error threshold to one of the high threshold values, the medium threshold values, increments a counter for the error threshold, and/or restores the error threshold back to the default error threshold.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (e.g., a non-transitory computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for efficient data system error recovery using a processor device in a computing environment, comprising:
dynamically adjusting an error threshold, from a default error threshold to one of a plurality of error threshold values comprising at least high threshold values, medium threshold values, and low threshold values, for a particular error associated with an event object indicating a responsive action for handling the particular error in a data system, the error threshold adjusted based on one of a plurality of system status changes caused by one of an external environment and an internal status, and adjusted commensurate with a timeframe in which the at least one of the plurality of system status changes occurred in relation to a previous error threshold adjustment; wherein the responsive action to the event object comprises determining whether the error threshold needs to be adjusted for the particular error, and wherein if it is determined the error threshold for the particular error does not need adjustment, the default error threshold is used.

2. The method of claim 1, wherein the plurality of system status changes include at least one of an availability of a related redundant resource, historical input/output (I/O) loads of the data system, a host server running an application, historical data, registered information to a device in the data system, and an in-progress update to an application.

3. The method of claim 2, further including defining the event object that defines how the particular error should be handled in the data system.

4. The method of claim 3, further including setting an event flag indicating the error threshold has been dynamically adjusted from the default error threshold to one of the high threshold values, the medium threshold values.

5. The method of claim 4, further including performing at least one of:
incrementing a counter for the error threshold, and
restoring the error threshold back to the default error threshold.

6. A system for efficient data system error recovery using a processor device in a data system in a computing environment, the system comprising:
a data system; and
at least one processor device operable in the computing environment for controlling the data system, wherein the at least one processor device: dynamically adjusts an error threshold, from a default error threshold to one of a plurality of error threshold values comprising at least high threshold values, medium threshold values, and low threshold values, for a particular error associated with an event object indicating a responsive action for handling the particular error in the data system, the error threshold adjusted based on one of a plurality of system status changes caused by one of an external environment and an internal status, and adjusted commensurate with a timeframe in which the at least one of the plurality of system status changes occurred in relation to a previous error threshold adjustment; wherein the responsive action to the event object comprises determining whether the error threshold needs to be adjusted for the particular error, and wherein if it is determined the error threshold for the particular error does not need adjustment, the default error threshold is used.

7. The system of claim 6, wherein the plurality of system status changes include at least one of an availability of a related redundant resource, historical input/output (I/O) loads of the data system, a host server running an application, historical data, registered information to a device in the data system, and an in-progress update to an application.

8. The system of claim 7, wherein the at least one processor device defines the event object that defines how the particular error should be handled in the data system.

9. The system of claim 8, wherein the at least one processor device sets an event flag indicating the error threshold has been dynamically adjusted from the default error threshold to one of the high threshold values, the medium threshold values.

10. The system of claim 9, wherein the at least one processor device performs at least one of:
incrementing a counter for the error threshold, and
restoring the error threshold back to the default error threshold.

11. A computer program product for efficient data system error recovery using a processor device in a computing environment, the computer program product comprising a non-transitory computer-readable storage medium having computer-readable program code portions stored therein, the computer-readable program code portions comprising:
a first executable portion that dynamically adjusts an error threshold, from a default error threshold to one of a plurality of error threshold values comprising at least high threshold values, medium threshold values, and low threshold values, for a particular error associated with an event object indicating a responsive action for handling the particular error in a data system, the error threshold adjusted based on one of a plurality of system status changes caused by one of an external environment and an internal status, and adjusted commensurate with a timeframe in which the at least one of the plurality of system status changes occurred in relation to a previous error threshold adjustment; wherein the responsive action to the event object comprises determining whether the error threshold needs to be adjusted for the particular error, and wherein if it is determined the error threshold for the particular error does not need adjustment, the default error threshold is used.

12. The computer program product of claim 11, wherein the plurality of system status changes include at least one of an availability of a related redundant resource, historical input/output (I/O) loads of the data system, a host server running an application, historical data, registered information to a device in the data system, and an in-progress update to an application.

13. The computer program product of claim 12, further including a second executable portion that defines the event object that defines how the particular error should be handled in the data system.

14. The computer program product of claim 13, further including a third executable portion that performs at least one of:

setting an event flag indicating the error threshold has been dynamically adjusted from the default error threshold to one of the high threshold values, the medium threshold values,
incrementing a counter for the error threshold, and
restoring the error threshold back to the default error threshold.

* * * * *